United States Patent
He et al.

(10) Patent No.: US 11,773,975 B2
(45) Date of Patent: Oct. 3, 2023

(54) SEALING PLUG

(71) Applicant: ILLINOIS TOOL WORKS INC., Glenview, IL (US)

(72) Inventors: Jiahui He, Shanghai (CN); Mengli Sun, Shanghai (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 154 days.

(21) Appl. No.: 17/120,725

(22) Filed: Dec. 14, 2020

(65) Prior Publication Data
US 2021/0180696 A1     Jun. 17, 2021

(30) Foreign Application Priority Data

Dec. 12, 2019  (CN) .......................... 201911293099.8
Nov. 18, 2020  (CN) ......................... 202011292474.X (51) Int. Cl.
*B62D 25/24* (2006.01)
*F16J 15/02* (2006.01)

(52) U.S. Cl.
CPC .................................. *F16J 15/022* (2013.01)

(58) Field of Classification Search
CPC ........ B62D 25/24; F16J 15/022; F16J 15/061; F16J 15/121; F16J 15/02
See application file for complete search history.

(56) References Cited

U.S. PATENT DOCUMENTS

| | | | | | |
|---|---|---|---|---|---|
| 2,552,917 | A | * | 5/1951 | Becker | B62D 25/24 24/453 |
| 3,018,535 | A | * | 1/1962 | Griffin | F16J 13/14 220/326 |
| 3,182,119 | A | * | 5/1965 | Millard | H02G 3/0616 16/2.2 |
| 3,672,532 | A | * | 6/1972 | Becker | B65D 59/02 138/89 |
| 3,700,135 | A | * | 10/1972 | Collier | B65D 51/00 220/200 |
| 3,944,107 | A | * | 3/1976 | Wallace | B62D 25/24 220/326 |
| 3,990,604 | A | * | 11/1976 | Barnett | B62D 25/24 215/358 |
| 4,041,241 | A | * | 8/1977 | Olmstead | H02G 3/088 277/627 |
| 4,091,962 | A | * | 5/1978 | van Buren, Jr. | B62D 25/24 220/326 |
| 4,094,436 | A | * | 6/1978 | Birmingham | B65D 51/08 220/315 |

(Continued)

*Primary Examiner* — Eugene G Byrd
(74) *Attorney, Agent, or Firm* — QUARLES & BRADY LLP (57) ABSTRACT

A sealing plug that is configured to seal a hole in a panel. The sealing plug comprises a plug body, at least two holding arms and a sealing portion. The plug body has a central axis and a support portion arranged around the central axis. Each of the at least two holding arms extends downward from the bottom of the support portion of the plug body and has a holding portion. The holding portions extend obliquely downward in a direction away from the central axis. The sealing portion is arranged on an outer edge of the support portion of the plug body. The sealing body is made of a metal material, and the sealing portion is made of a material with a melting point lower than that of the metal material.

12 Claims, 9 Drawing Sheets

(56) References Cited

U.S. PATENT DOCUMENTS

| | | | | |
|---|---|---|---|---|
| 4,363,420 A | * | 12/1982 | Andrews | B62D 25/24 |
| | | | | 29/458 |
| 4,588,104 A | * | 5/1986 | Danico | B62D 25/24 |
| | | | | 220/326 |
| 4,588,105 A | * | 5/1986 | Schmitz | B29C 66/474 |
| | | | | 220/359.4 |
| 5,505,324 A | * | 4/1996 | Danico | B62D 25/24 |
| | | | | 220/359.4 |
| 5,702,133 A | * | 12/1997 | Pavur | B62D 25/24 |
| | | | | 220/795 |
| 2014/0125081 A1 | * | 5/2014 | Pares Isanta | B62D 25/24 |
| | | | | 296/1.06 |
| 2015/0135598 A1 | * | 5/2015 | Jatzke | F16J 13/12 |
| | | | | 49/463 |
| 2016/0244104 A1 | * | 8/2016 | Kuhm | B05C 21/005 |
| 2017/0152948 A1 | * | 6/2017 | Huebner | B62D 25/24 |
| 2020/0386314 A1 | * | 12/2020 | Ventallo | B60J 10/23 |

\* cited by examiner

SEALING PLUG

CROSS REFERENCES TO RELATED APPLICATIONS

This application claims the benefit of Chinese Patent Application No. 201911293099.8, filed on Dec. 12, 2019, and Chinese Patent Application No. 202011292474.X, filed on Nov. 18, 2020, both of which are incorporated herein by reference in their entirety.

TECHNICAL FIELD

The present disclosure relates to a sealing plug, and in particular, to a sealing plug for use in a vehicle.

BACKGROUND

In vehicles, especially in vehicles using batteries as driving energy sources, there is a need for a sealing plug to separate a space where the batteries are placed from a space inside a vehicle compartment.

SUMMARY OF THE DISCLOSURE

Exemplary embodiments of the present disclosure can solve at least some technical problems in the prior art. For example, the present disclosure provides a sealing plug for sealing a hole in a panel. The sealing plug comprises a plug body, a support portion arranged around central axis of the plug body, at least two holding arms and a sealing portion. Each of the at least two holding arms extends downward from the bottom of the support portion of the plug body and has a holding portion. The holding portions extend obliquely downward in a direction away from the central axis. The sealing portion is arranged on an outer edge of the support portion of the plug body. The plug body is made of a metal material, and the sealing portion is made of a material with a melting point lower than that of the metal material.

In the sealing plug according to the present disclosure, the sealing plug is configured such that when the sealing plug is mounted in the hole in the panel, the holding portions of the at least two holding arms are located below the panel, the support portion and the sealing portion are located above the panel, and the sealing portion comes into contact with the panel such that the hole is sealed by the sealing plug.

In the sealing plug according to the present disclosure, the sealing portion is made of a flexible material.

In the sealing plug according to the present disclosure, the sealing portion is made of rubber or plastics.

In the sealing plug according to the present disclosure, the sealing portion is made of an ethylene-vinyl acetate copolymer.

In the sealing plug according to the present disclosure, the at least two holding arms respectively have root portions connected to the support portion, and a distance r from the root portions to the central axis is less than a radius R of the hole of the panel.

In the sealing plug according to the present disclosure, the support portion of the plug body comprises a support body portion and the outer edge, and the outer edge is arranged around the support body portion. The outer edge comprises at least two first outer edge portions and at least two second outer edge portions. The at least two first outer edge portions extend obliquely outward and downward from the support body portion. The at least two second outer edge portions are arranged to separate the at least two first outer edge portions and extend in an extending direction of the support body portion, wherein the at least two holding arms are respectively arranged corresponding to the at least two second outer edge portions.

In the sealing plug according to the present disclosure, a lowest position of a free end of each of the at least two first outer edge portions is located in the same plane as a lower surface of each of the at least two second outer edge portions.

In the sealing plug according to the present disclosure, the plug body further comprises an insertion portion, which extends downward from the support portion, the support portion is arranged around the insertion portion, the at least two holding arms are arranged around the insertion portion, and the insertion portion is configured to be insertable into the hole of the panel.

In the sealing plug according to the present disclosure, the plug body is integrally formed from sheet metal.

In the sealing plug according to the present disclosure, the at least two holding arms comprise two holding arms, which are symmetrically arranged with respect to the central axis of the plug body.

In the sealing plug according to the present disclosure, the at least two holding arms comprise four holding arms, which are uniformly arranged in a circumferential direction of the plug body.

The sealing plug according to the present disclosure can seal a hole in a panel, and the hole can be substantially sealed by the plug body even when the ambient temperature is relatively high.

BRIEF DESCRIPTION OF THE DRAWINGS

These and other features and advantages of the present disclosure may be better understood by reading the following detailed description with reference to the accompanying drawings. The same reference numerals represent the same components throughout the accompanying drawings, in which.

DETAILED DESCRIPTION OF EMBODIMENTS

Various specific embodiments of the present disclosure are described below with reference to the accompanying drawings which constitute part of this description. It should be understood that although the terms, such as "upper", "lower", "top", "side" and "bottom", indicating orientations are used in the present disclosure to describe various exemplary structural parts and elements in the present disclosure, these terms are merely used herein for ease of illustration, and are determined based on the exemplary orientations as shown in the accompanying drawings. Since the embodiments disclosed in the present disclosure can be arranged in different directions, these terms indicating directions are only illustrative and should not be considered as limitations. In the following accompanying drawings, the same reference numerals are used for the same components, and similar reference numerals are used for similar components.

Figure 1A:
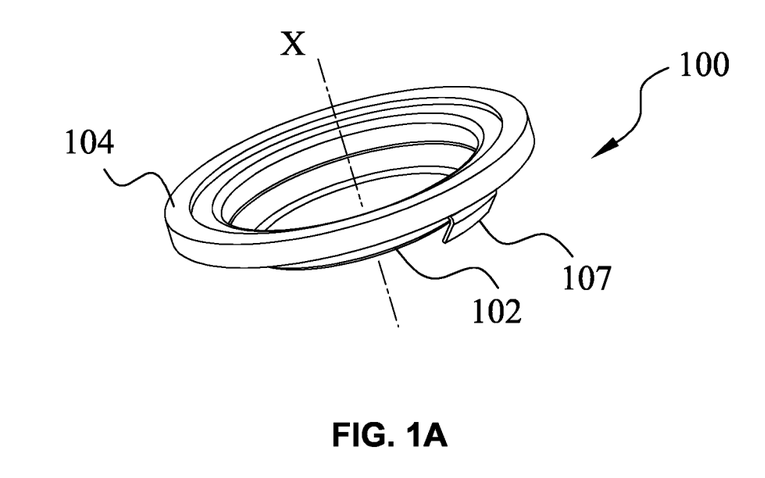
FIG. 1A is a perspective view of an embodiment of a sealing plug according to the present disclosure viewed from top to bottom.
Figure 1B:
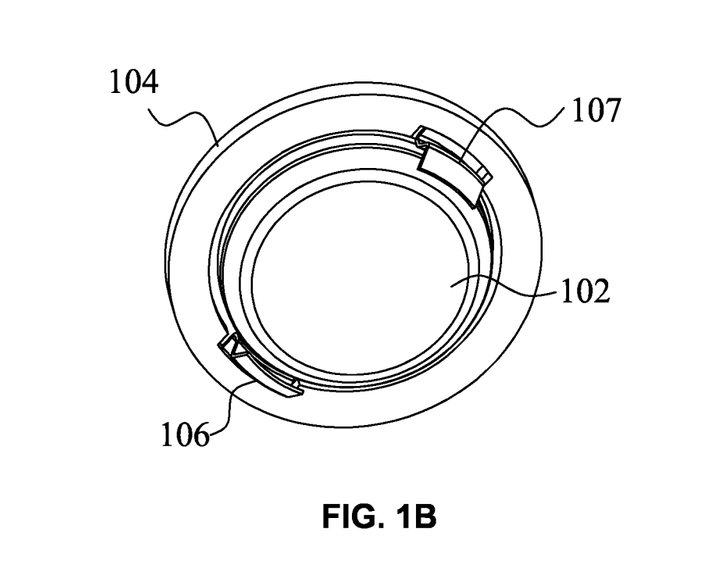
FIG. 1B is a perspective view of the sealing plug shown in FIG. 1A viewed from bottom to top.
Figure 1C:
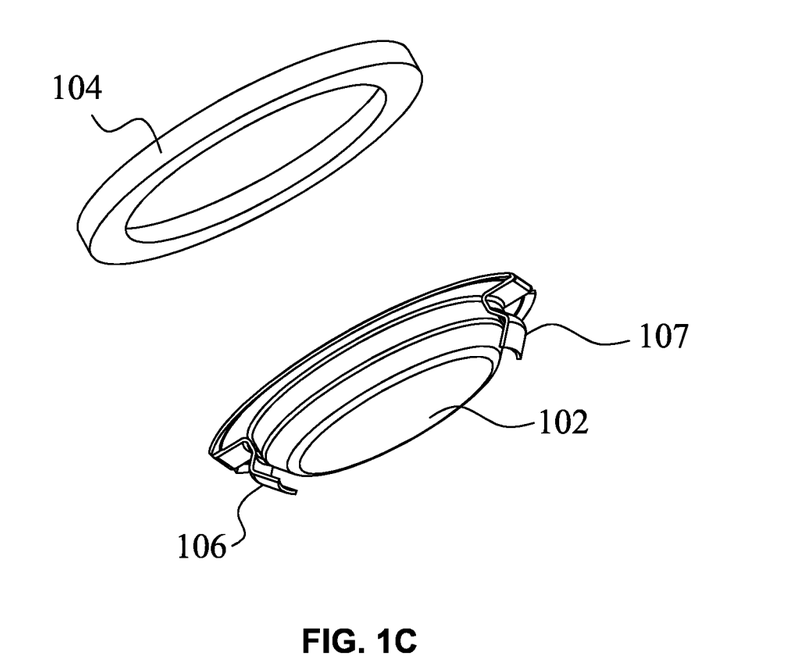
FIG. 1C is an exploded view of the sealing plug shown in FIG. 1A.
Figure 2A:
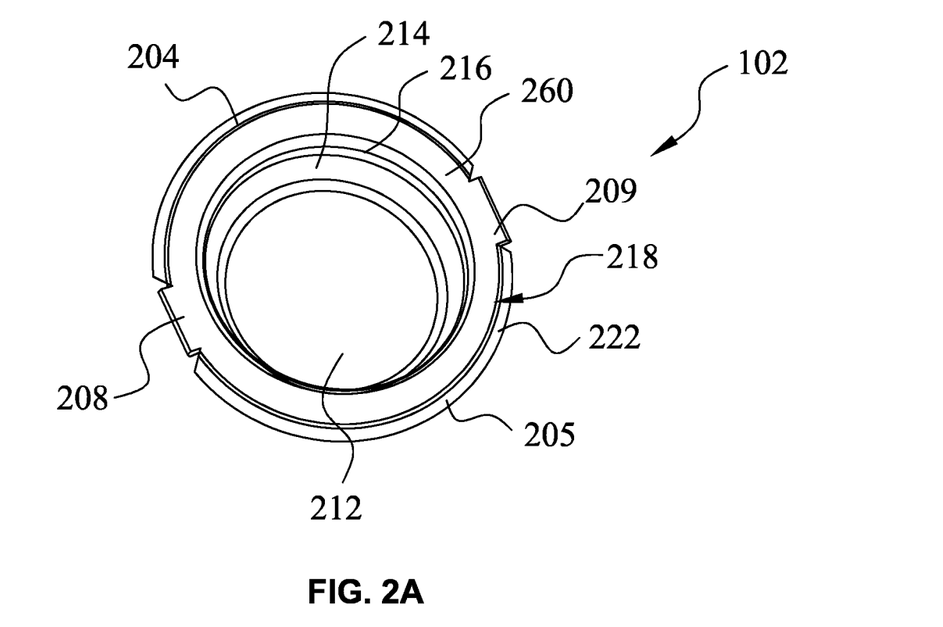
FIG. 2A is a perspective view of a plug body of the sealing plug shown in FIG. 1C viewed from top to bottom.
Figure 2B:
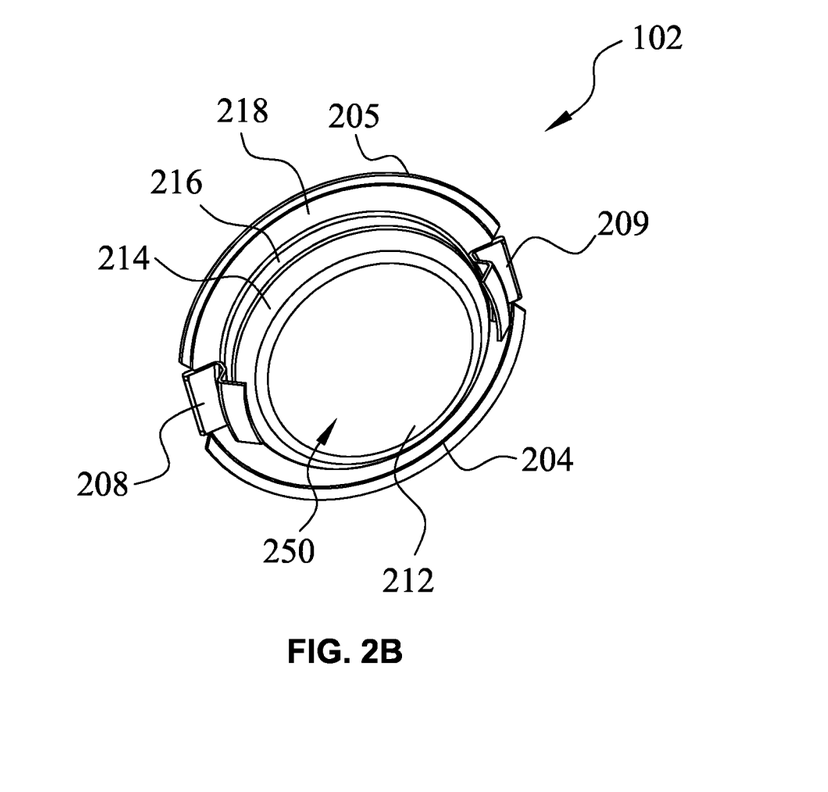
FIG. 2B is a perspective view of the plug body of the sealing plug shown in FIG. 1C viewed from bottom to top.

FIG. 1A is a perspective view of an embodiment of a sealing plug according to the present disclosure viewed from top to bottom; FIG. 1B is a perspective view of the sealing plug 100 shown in FIG. 1A viewed from bottom to top; and FIG. 1C is an exploded view of the sealing plug 100 shown in FIG. 1A, these figures show the specific structure of the sealing plug 100. As shown in FIGS. 1A-1C, the sealing plug 100 comprises a plug body 102, a first holding arm 106, a second holding arm 107, and a sealing portion 104. The first holding arm 106 and the second holding arm 107 extend downward from the bottom of a support portion 218 (as shown in FIGS. 2A and 2B) of the plug body 102. The sealing portion 104 is annular and is disposed on an outer edge 222 of the support portion 218 of the plug body 102 (see FIGS. 2A and 2B). Specifically, the sealing portion 104 surrounds and wraps around the outer edge 222 of the support portion 218 of the plug body 102.

FIG. 2A is a perspective view of the plug body 102 of the sealing plug 100 shown in FIG. 1A viewed from top to bottom; and FIG. 2B is a perspective view of the plug body 102 shown in FIG. 1A viewed from bottom to top, these figures show the specific structure of the plug body 102. As shown in FIGS. 2A and 2B, the plug body 102 is substantially in the shape of a bowl with a central axis X. The plug body 102 comprises the support portion 218 and an insertion portion 250 extending downward from the support portion 218. The support portion 218 is arranged around the insertion portion 250, the insertion portion 250 is generally in the shape of a cylinder with a closed bottom and an open top, and the support portion 218 and the insertion portion 250 form the bowl-shaped plug body 102 together. Specifically, the insertion portion 250 comprises a bottom plate 212, an inclined portion 214, and a side wall 216 which are sequentially arranged from top to bottom. The bottom plate 212 is substantially circular. The inclined portion 214 is arranged around a lateral edge of the bottom plate 212 and extends upward and outward by a certain distance. The side wall 216 is arranged around an upper edge of the inclined portion 214 and extends upward by a certain distance.

The support portion 218 comprises a support body portion 260 and an outer edge 222 arranged around the support body portion 260. The outer edge 222 of the support portion 218 is the outer edge 222 of the plug body 102. The support body portion 260 is arranged around the top of the side wall 216 and extends outward by a certain distance in a direction generally perpendicular to the central axis X of the plug body 102. The outer edge 222 is arranged around the support body portion 260.

The outer edge 222 of the plug body 102 comprises two first outer edge portions 204, 205 and two second outer edge portions 208, 209. The first outer edge portion 204 and the first outer edge portion 205 are respectively disposed between the second outer edge portion 208 and the second outer edge portion 209. In other words, the two first outer edge portions 204, 205 and the two second outer edge portions 208, 209 are arranged separately with respect to each other. The specific structures of the two first outer edge portions 204, 205 and the two second outer edge portions 208, 209 will be described below with reference to FIGS. 3A-3D.

Figure 3A:
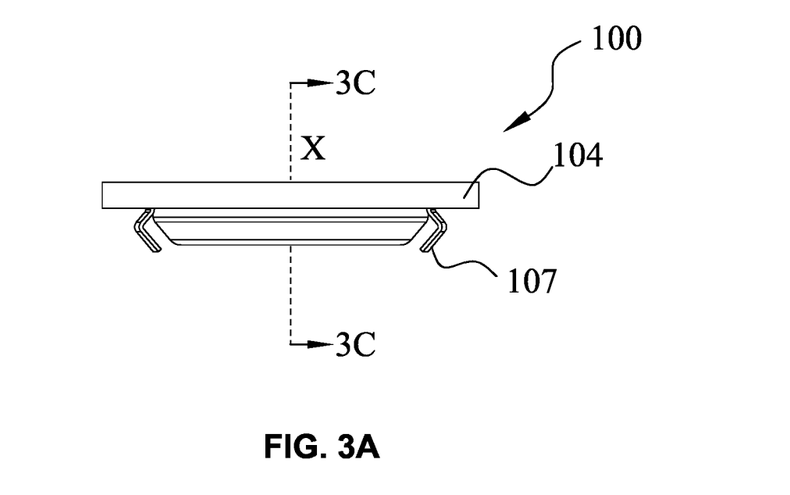
FIG. 3A is a front view of the sealing plug shown in FIG. 1A.
Figure 3B:
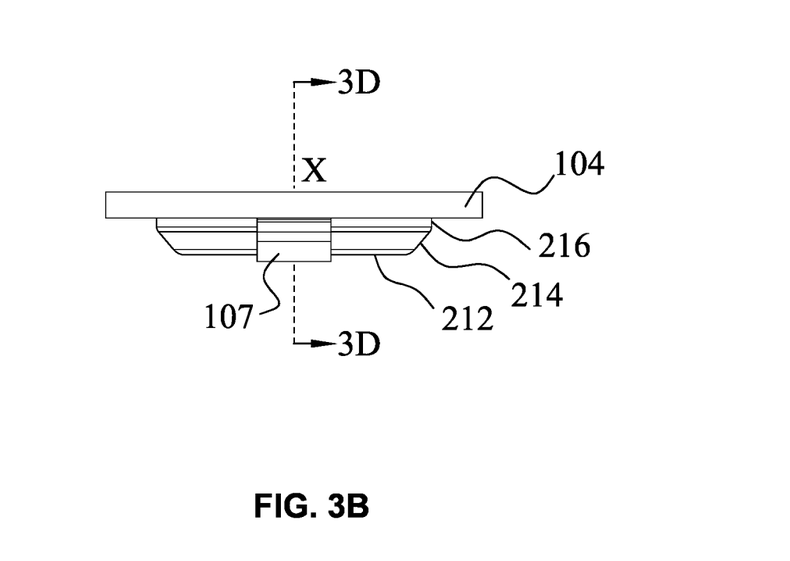
FIG. 3B is a side view of the sealing plug shown in FIG. 1A.
Figure 3C:
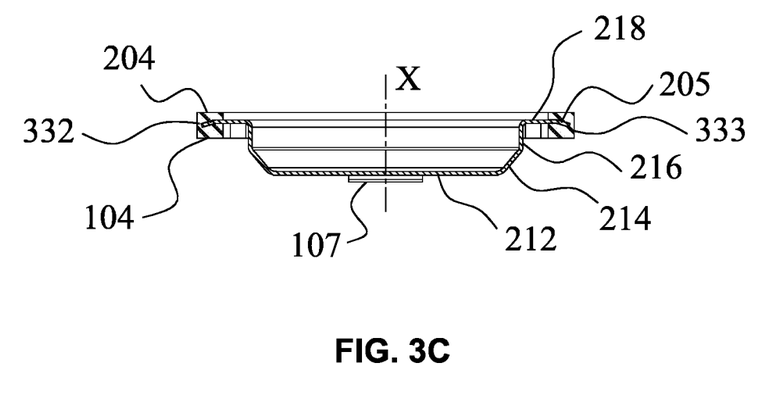
FIG. 3C is a cross-sectional view of the sealing plug shown in FIG. 3A taken along a line 3C-3C in FIG. 3A.
Figure 3D:
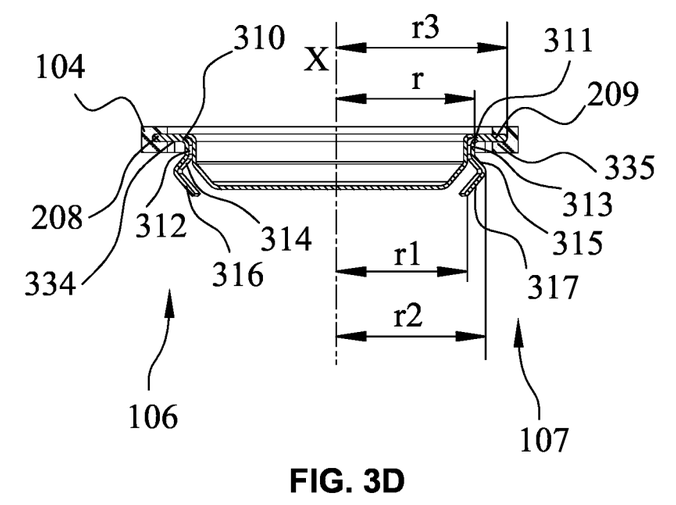
FIG. 3D is a cross-sectional view of the sealing plug shown in FIG. 3B taken along a line 3D-3D in FIG. 3B.

FIG. 3A is a front view of the sealing plug 100 shown in FIG. 1, and FIG. 3B is a side view of the sealing plug 100 shown in FIG. 1, these figures show the relative positional relationship between the sealing portion 104, the insertion portion 250 of the plug body 102 and the two holding arms 106, 107. FIG. 3C is a cross-sectional view of the sealing plug shown in FIG. 3A along a line A-A in FIG. 3A, and FIG. 3D is a cross-sectional view of the sealing plug shown in FIG. 3B along a line B-B in FIG. 3B, these figures show details of the sealing plug 100. In the orientation shown in FIGS. 3A-3D, the central axis X of the plug body 102 extends generally in a vertical direction, and the support body portion 260 extends generally in a horizontal direction. The following description of the structure of the sealing plug 100 takes the above orientation as a reference direction, so as to make the description clearer.

As shown in FIGS. 3A-3D, the two first outer edge portions 204, 205 of the plug body 102 respectively extend obliquely outward and downward from the support body portion 260 by a certain distance. Free ends 332, 333 of the two first outer edge portions 204, 205 are lowest ends of the two first outer edge portions 204, 205, and the free ends 332, 333 are located in the same horizontal plane.

As shown in FIGS. 3A-3D, the first holding arm 106 and the second holding arm 107 respectively extend downward from the bottom of the support portion 218 of the plug body 102, and are symmetrically arranged with respect to the central axis X of the plug body. Specifically, the first holding arm 106 comprises a root portion 310, a vertical portion 312, a holding portion 314, and a retract portion 316. The root portion 310, the vertical portion 312, the holding portion 314, and the retract portion 316 are sequentially connected to one another. The root portion 310 is connected to the bottom of the support portion 218, and the vertical portion 312 extends vertically downward from the root portion 310 by a certain distance. The holding portion 314 extends downward and outward by a certain distance from the bottom of the vertical portion 312, such that the holding portion 314 is bent outward relative to the vertical portion 312 in a direction away from the central axis X. The retract portion 316 extends downward and inward from the bottom of the holding portion 314 by a certain distance, such that the retract portion 316 is bent inward relative to the holding portion 314 in a direction toward the central axis X. The second holding arm 107 has the same structure as the first holding arm 106. Specifically, the second holding arm 107 comprises a root portion 311, a vertical portion 313, a holding portion 315, and a retract portion 317. The root portion 311, the vertical portion 313, the holding portion 315, and the retract portion 317 are sequentially connected to one another. The root portion 311 is connected to the bottom of the support portion 218, and the vertical portion 313 extends vertically downward from the bottom of the plug body 102 by a certain distance. The holding portion 315 extends downward and outward by a certain distance from the bottom of the vertical portion 313, such that the holding portion 315 is bent outward relative to the vertical portion 313 in a direction away from the central axis X. The retract portion 317 extends downward and inward from the bottom of the holding portion 315 by a certain distance, such that the retract portion 317 is bent inward relative to the holding portion 315 in a direction toward the central axis X. A distance from the root portions 310, 311 of the first holding arm 106 and the second holding arm 107 to the central axis X is r. A distance from lowest ends of the retract portion 316 and the retract portion 317 to the central axis X is r1. A distance from bottoms of the holding portion 314 and the holding portion 315 (i.e., parts of the holding portions 314, 315 that are connected to the retract portions 316, 317) to the central axis X is r2, wherein, r is less than r2, and r1 is less than r2.

Figure 5A:
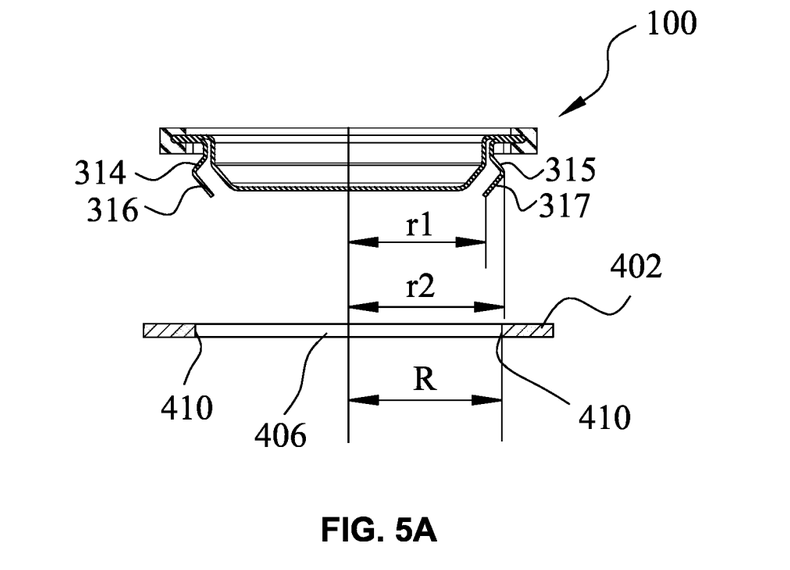
FIG. 5A shows a cross-sectional view of the sealing plug when being placed above the panel taken along a line 5A-5A in FIG. 4B.
Figure 5B:
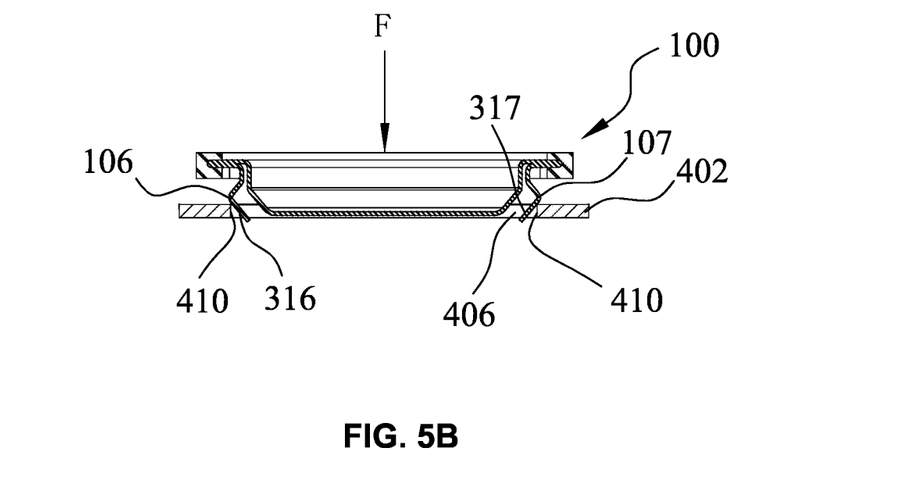
FIG. 5B shows a cross-sectional view of the sealing plug of FIG. 5A having a first holding arm and a second holding arm of the sealing plug coming into contact with a wall of a hole of the panel but not being deformed.
Figure 5C:
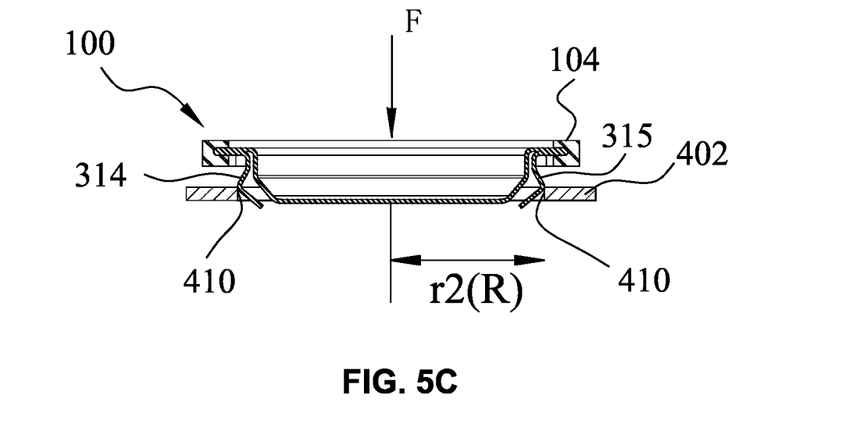
FIG. 5C shows a cross-sectional view of the the sealing plug of FIG. 5A, the first holding arm and the second holding arm of the sealing plug coming into contact with the wall of the hole of the panel and being deformed.
Figure 5D:
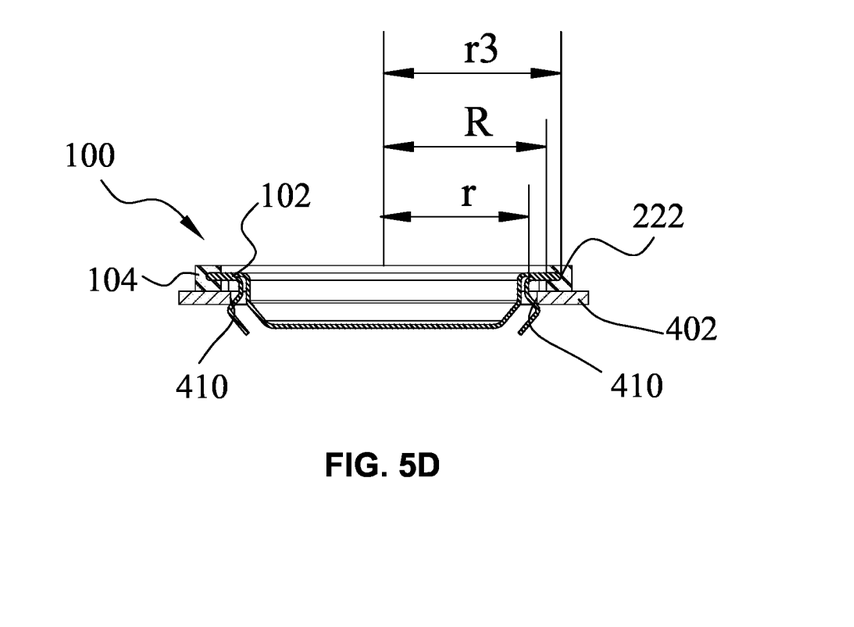
FIG. 5D shows a cross-sectional view of the sealing plug of FIG. 5A, wherein the sealing plug is mounted on the panel and held in place.

The arrangement of the holding portions 314, 315 enables the sealing plug 100 to be held in a hole 406 of a panel 402 by means of the holding portions 314, 315 (as shown in FIG. 5D). The arrangement of the retract portions 316, 317 enables the two holding arms 106, 107 to deform toward the central axis X without the need for manual compressing, so that the holding portions 314, 315 can pass through the hole 406. The retract portions and the holding portions together form a bent shape, which can help to enhance a holding force of the holding portions 314, 315 when the sealing plug 100 is mounted in place.

As shown in FIG. 3D, the holding portions 314, 315 and the retract portions 316, 317 of the two holding arms 106, 107 directly face the inclined portion 214 of the insertion portion 250 of the plug body 102. Due to the arrangement of the inclined portion 214, the two holding arms 106, 107 have a larger deformation space, which makes it easier to insert the sealing plug 100.

The two second outer edge portions 208, 209 respectively extend outward by a certain distance in the extending direction of the support body portion 260 of the support portion 218, namely, the horizontal direction shown in the figures. The two first outer edge portions 204, 205 and the two second outer edge portions 208, 209 are arranged such that a lowest position of the free end 332 (i.e., the distal end) of the first outer edge portion 204, a lowest position of the free end 333 (i.e., the distal end) of the first outer edge portion 205, a lower surface 334 of the second outer edge portion 208 and a lower surface 335 of the second outer edge portion 209 are located in the same horizontal plane.

The sealing portion 104 is annular-shaped and wraps around the outer edge 222 of the plug body 102. In an embodiment of the present disclosure, the sealing portion 104 fully wraps around the two first outer edge portions 204, 205 and the two second outer edge portions 208, 209. The sealing portion 104 may be made of a flexible material with a melting point lower than that of a metal. For example, the sealing portion 104 may be made of rubber or plastics. More specifically, the sealing portion 104 may be made of an ethylene-vinyl acetate copolymer. As an example, the sealing portion 104 may be connected to the outer edge 222 of the plug body 102 by means of injection molding.

In an embodiment of the present disclosure, the plug body 102, the first holding arm 106 and the second holding arm 107 may be formed from a metal plate by means of sheet metal stamping, cutting, bending and other processes. The specific formation process is as follows, for example: first, an insertion portion 250 of a plug body 102 is formed by stamping a notch on a metal plate by using a stamping process. Subsequently, a metal plate zone around the top of the insertion portion 250 is selected as a support body portion 260 of a support portion 218, then the metal plate around an outer periphery of the support body portion 260 is cut into four portions, wherein two opposite portions are used to form first outer edge portions 204, 205, and the other two opposite portions are used to form second outer edge portions 208, 209, a first holding arm 106 and a second holding arm 107. The two metal plate portions, which form the second outer edge portions 208, 209, the first holding arm 106 and the second holding arm 107, are firstly trimmed to have appropriate lengths, and then form the first holding arm 106, the second holding arm 107 and the second outer edge portions 208, 209 shown in figures by using a bending process. The two metal plate portions, which form the first outer edge portions 204, 205, are firstly trimmed to have an appropriate length, and are then bent downward to form the inclined first outer edge portions 204, 205. Since the second outer edge portions 208, 209 are as thick as two layers of metal plates while the first outer edge portions 204, 205 are only as thick as one layer of metal plate, with the inclination of the first outer edge portions 204, 205, a lowest position of the free end 332 (i.e., the distal end) of the first outer edge portion 204, a lowest position of the free end 333 (i.e., the distal end) of the first outer edge portion 205, a lower surface 334 of the second outer edge portion 208 and a lower surface 335 of the second outer edge portion 209 can be located in the same horizontal plane.

Figure 4A:
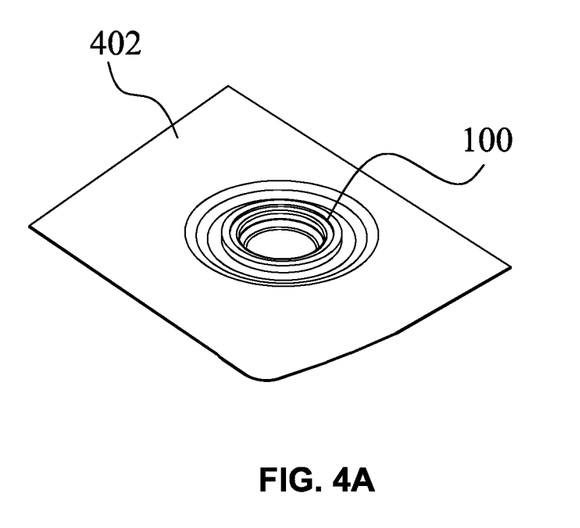
FIG. 4A is an assembly view sealing plug, wherein the sealing plug is mounted in a panel.
Figure 4B:
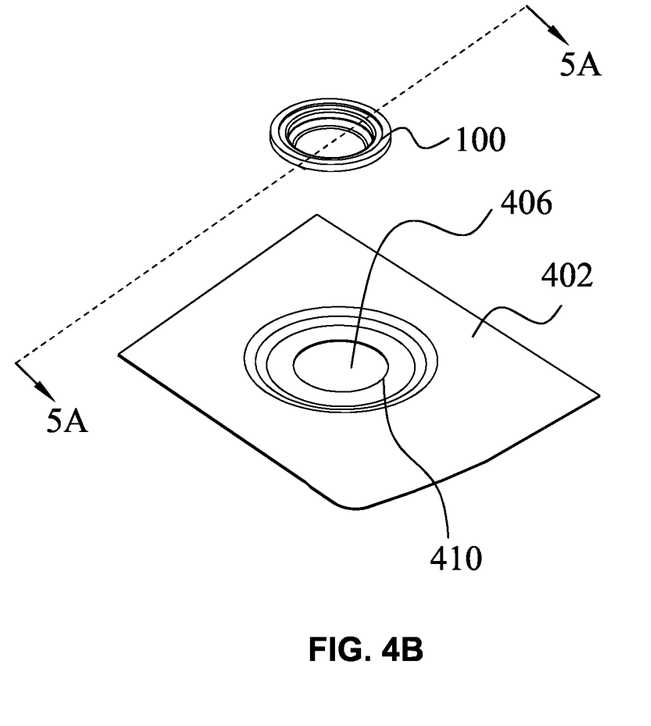
FIG. 4B is a exploded view of the sealing plug and the panel shown in FIG. 4A.

FIG. 4A is an assembly view of the sealing plug 100, wherein the sealing plug 100 is mounted in the panel 402; and FIG. 4B is an exploded view corresponding to the assembly view shown in FIG. 4A. As shown in FIGS. 4A and 4B, the panel 402 has a circular hole 406. The hole 406 has a wall 410. The sealing plug 100 is positioned above the panel 402 and moved downward, then inserted into the hole 406, and held in place. The process of mounting the sealing plug 100 to the panel 402 will be described in detail with reference to FIGS. 5A-5D.

FIGS. 5A-5D are cross-sectional views of the sealing plug 100 at different relative positions in the process of being mounted on the panel 402. FIG. 5A shows a cross-sectional view of the sealing plug 100 when being placed above the panel 402, to show the relative size relationship between the sealing plug 100 and the hole 406 in the panel 402. Specifically, the radius of the hole 406 is R. The radius R of the hole 406 is greater than the distance r1 from the lowest end of the retract portion 317 to the central axis X, and the radius R of the hole 406 is less than the distance r2 from the bottom of the holding portion 315 (i.e. the part of the holding portion 315 that is connected to the retract portion 317) to the central axis X. That is to say, in the embodiments shown in FIGS. 5A-5D, the distance 2r1 between lowest ends of the retract portions 316, 317 of the two holding arms is less than the diameter 2R of the hole 406, so that the lowest ends of the retract portions 316, 317 can be inserted into the hole 406 even in a free state without force application. On the other hand, the distance 2r2 between the lowest ends of the holding portions 314, 315 of the two holding arms is greater than the diameter 2R of the hole 406. Therefore, the holding portions 314, 315 of the two holding arms need to be deformed by force before being inserted into the hole 406.

FIG. 5B shows a cross-sectional view of the retract portion 316 of the first holding arm 106 and the retract portion 317 of the second holding arm 107 of the sealing plug 100 when coming into contact with the wall 410 of the hole 406 of the panel 402 but not being subjected to an external force. As shown in FIG. 5B, the sealing plug 100 continues to move downward, the lowest ends of the retract portions 316, 317 of the two holding arms 106, 107 are inserted into the hole 406, and the retract portions 316, 317 then come into contact with the wall 410 of the hole 406.

FIG. 5C shows a cross-sectional view of the retract portion 316 of the first holding arm 106 and the retract portion 317 of the second holding arm 107 of the sealing plug 100 when coming into contact with the wall 410 of the hole 406 of the panel 402 and being subjected to an external force. As shown in FIG. 5C, as the sealing plug 100 continues to move downward, the retract portions 316, 317 are subjected to the inward external force exerted by the panel 402. This external force causes the retract portions 316, 317 of the two holding arms to deform together with the holding portions 314, 315, and this deformation causes the two holding arms to move toward the central axis X as a whole. When the first holding arm 106 and the second holding arm 107 are deformed such that the distance 2r2 between the lowest ends of the deformed holding portions 314 and 315 is generally equal to the radius R of the hole 406, the bent shape formed by the holding portions and the retract portions of the first holding arm 106 and the second holding arm 107 can pass through the hole 406, such that the lowest ends of the holding portion 314 and the holding portion 315 reach below the hole 406.

FIG. 5D shows a cross-sectional view of the sealing plug 100, wherein the sealing plug 100 is mounted on the panel 402 and held in place. As shown in FIG. 5D, after the holding portion 314 and the holding portion 315 of the first holding arm 106 and the second holding arm 107 reach below the hole 406, the distance 2r between the root portions 310, 311 of the first holding arm 106 and second holding arm 107 is less than the diameter 2R of the hole 406, so the sealing plug 100 can continue to move downward, and since the wall 410 of the hole 406 no longer exerts an external force to the first holding arm 106 and the second holding arm 107, the first holding arm 106 and the second holding arm 107 return to their initial states (i.e., not being deformed). The sealing plug 100 continues to move downward until the bottom of the sealing portion 104 comes into contact with the panel 402. In this case, the lowest ends of the holding portions 314, 315 and the retract portions 316, 317 of the first holding arm 106 and the second holding arm 107 are located below the panel 402, and the sealing portion 104 is located above the panel 402.

Subsequently, an operator may heat the sealing portion 104 using a heating component (not shown), such that the sealing portion 104 is melted and adhered to an upper surface of the panel 402. This enables the sealing plug 100 and the panel 402 to be connected to each other, and the hole 406 is sealed by the plug body 102 of the sealing plug 100.

The plug body 102, the first holding arm 106 and the second holding arm 107 of the sealing plug 100 of the present disclosure are formed by means of sheet metal stamping and bending, which can simplify the machining process and reduce manufacturing costs. In addition, metal can provide high heat resistance, so that it is ensured that when the sealing plug 100 experiences a relatively high temperature, even if the sealing portion 104 in the sealing plug 100 is vaporized due to the high temperature, the support portion 218 of the plug body 102 can still cover the hole 406 of the panel 402, and high sealing performance can also be ensured. Specifically, when the environment where the sealing plug 100 is located is at a relatively high temperature, the sealing portion 104 may be melted and vaporized, and the sealing portion 104 disappears. Since the shortest distance r3 from the outer edge 222 of the plug body 102 to the central axis X is greater than the radius R of the hole 406, the first outer edge portions 204, 205 and the two second outer edge portions 208, 209 of the plug body 102 can be overlapped on the upper surface of the panel 402, to prevent the sealing plug 100 from escaping from the hole 406. Since the lowest position of the free end 332 (i.e., the distal end) of the first outer edge portion 204, the lowest position of the free end 333 (i.e., the distal end) of the first outer edge portion 205, the lower surface 334 of the second outer edge portion 208 and the lower surface 335 of the second outer edge portion 209 are located in the same horizontal plane (see FIGS. 3A-3C), the first outer edge portions 204, 205 and the second outer edge portions 208, 209 can both come into contact with the upper surface of the panel 402, and all the portions of the outer edge 222 of the plug body 102 can come into contact with the upper surface of the panel 402, so that a sealing ring can also be formed by the outer edge 222 of the plug body 102, thus the plug body 102 can seal the hole 406. Therefore, the sealing plug 100 of the present disclosure can well adapt to a high-temperature working environment, and can implement the function of sealing the hole 406 of the panel even if the ambient temperature becomes high.

It needs to be noted that since, in the embodiment of the present disclosure, the plug body 102, the first holding arm 106 and the second holding arm 107 are formed from a metal plate by means of sheet metal stamping, cutting, bending and other processes, the second outer edge portions 208, 209 are as thick as two layers of metal plates and the first outer edge portions 204, 205 are only as thick as one layer of metal plate. Therefore, the first outer edge portions 204, 205 are obliquely arranged such that the lowest position of the free end 332 (i.e., the distal end) of the first outer edge portion 204, the lowest position of the free end 333 (i.e., the distal end) of the first outer edge portion 205, the lower surface 334 of the second outer edge portion 208 and the lower surface 335 of the second outer edge portion 209 are located in the same horizontal plane. Those skilled in the art can understand that in other embodiments, the sealing plug in the embodiment of the present disclosure may not be formed by means of sheet metal stamping, cutting, bending and other processes, so that the first outer edge portions 204, 205 and the second outer edge portions 208, 209 in the sealing plug may form a continuous outer edge, may be configured to have the same thickness, and may be planar or be obliquely arranged such that the lowest positions of the lower surfaces of the outer edges (i.e., the first outer edge portions 204, 205 and the second outer edge portions 208, 209) of the support portion 218 are located in the same plane. Therefore, when the sealing portion 104 disappears, the lower surface of the outer edge 222 can abut against the panel 402, so as to seal the hole 406 of the panel 402 by means of the outer edge 222 of the support portion 218.

Figure 6:
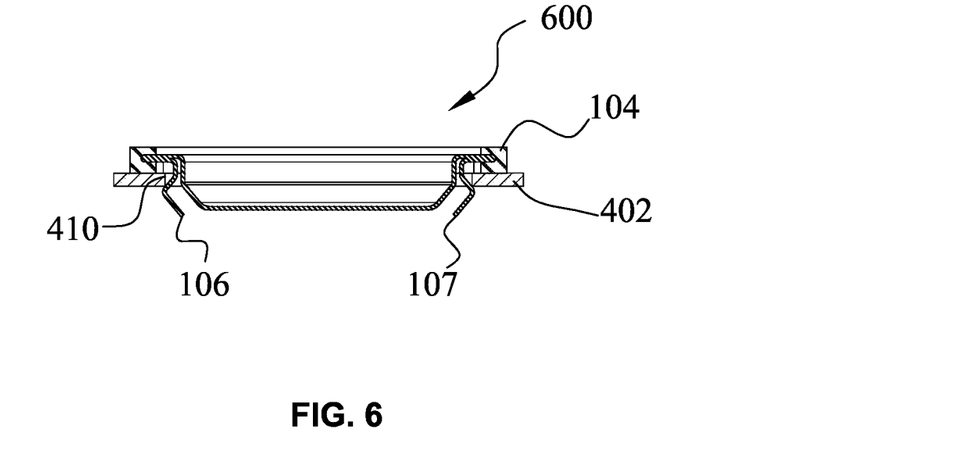
FIG. 6 is a cross-sectional view of another embodiment of a sealing plug according to the present disclosure.

FIG. 6 is a cross-sectional view of another embodiment of a sealing plug 600 according to the present disclosure. The structure of the sealing plug 600 shown in FIG. 6 is substantially the same as that of the sealing plug 100 shown in FIG. 5D, and the similarities will not be repeated. This sealing plug differs from the sealing plug 100 shown in FIG. 5D in that a first holding arm 106 and a second holding arm 107 of the sealing plug 600 are configured such that when the sealing plug 600 is mounted to the panel 402 and held in place (i.e., a sealing portion 104 of the sealing plug 600 comes into contact with the panel 402), the first holding arm 106 and the second holding arm 107 are still in a deformed state. In this case, the wall 410 of the hole 406 still exerts an inward external force on the first holding arm 106 and the second holding arm 107, such that the panel 402 is clamped by the first holding arm 106 and the sealing portion 104, and by the second holding arm 107 and the sealing portion 104. With this clamping configuration, the sealing plug 600 can be fixed in the hole 406 more securely because metal can provide stronger rigidity and deformability. Therefore, compared with the sealing plug 100 shown in FIG. 5D, the first holding arm 106 and the second holding arm 107 of the sealing plug 600 shown in FIG. 6 have different dimensions. For example, compared with FIG. 5D, vertical portions 312, 313 of the two holding arms 106, 107 of the sealing plug 600 shown in FIG. 6 are set to be shorter. As another example, compared with FIG. 5D, inclination angles of the holding portions 314, 315 of the two holding arms 106, 107 of the sealing plug 600 relative to the vertical portions 312, 313 shown in FIG. 6 are set to be larger.

Figure 7:
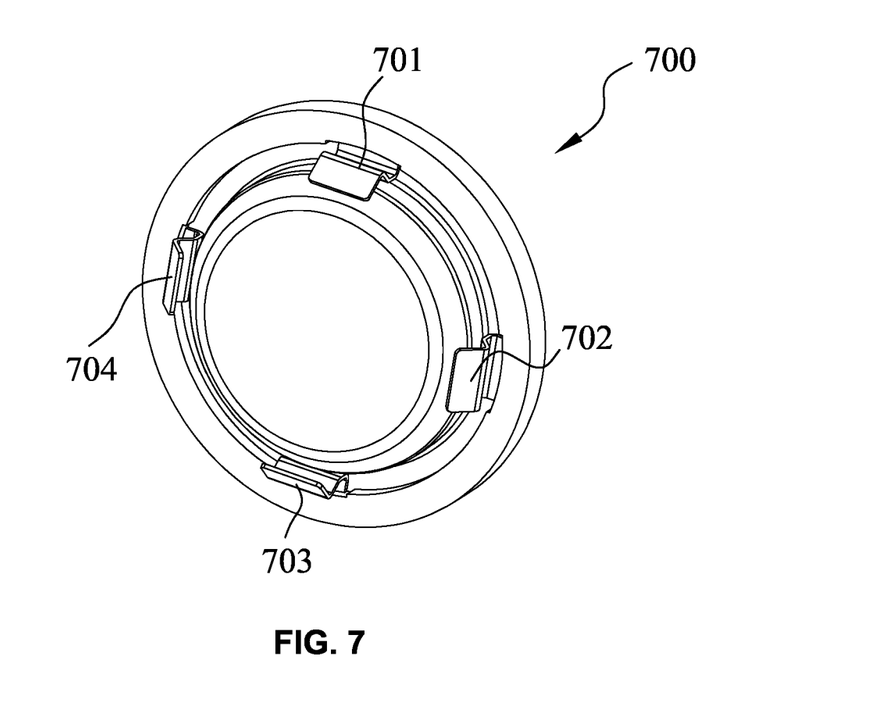
FIG. 7 is a perspective view of yet another embodiment of a sealing plug according to the present disclosure.

FIG. 7 is a cross-sectional view of yet another embodiment of a sealing plug 700 according to the present disclosure. The structure of the sealing plug 700 shown in FIG. 7 is substantially the same as that of the sealing plug 100 shown in FIG. 1, and the similarities will not be repeated. The sealing plug shown in FIG. 7 differs from the sealing plug 100 shown in FIG. 1 in that the sealing plug 700 comprises four holding arms 701, 702, 703, 704, four first outer edge portions (not shown), and four second outer edge portions (not shown). The four holding arms 701, 702, 703, 704 are uniformly arranged in a circumferential direction of the plug body 102. Each of the four first outer edge portions is disposed above a corresponding one of the four holding arms 701, 702, 703, 704. The four second outer edge portions are arranged between the four first outer edge portions. In other words, the four second outer edge portions and the four first outer edge portions are arranged separately with respect to each other. When an operator presses the sealing plug 700 into the hole 406, the four holding arms 701, 702, 703, 704 can better disperse the external force exerted by the wall 410 of the hole 406 on the holding arms, so that the sealing plug 700 has better stability.

Although a sealing plug with two holding arms or four holding arms is shown in the present disclosure, it can be understood by those skilled in the art that sealing plugs with at least two holding arms fall within the scope of protection of the present disclosure. In addition, the number of the first outer edge portions and the number of the second outer edge portions are the same as the number of the holding arms, and the first outer edge portions and the second outer edge portions are arranged separately with respect to each other. For example, it is also possible to provide three holding arms, which are uniformly arranged in a circumferential direction of the plug body, and to provide three first outer edge portions arranged corresponding to the three holding arms on a one-to-one basis, and second outer edge portions arranged between every two adjacent first outer edge portions.

Although only some features of the present disclosure are illustrated and described herein, those skilled in the art may make various improvements and changes. Therefore, it should be understood that the appended claims intend to cover all the foregoing improvements and changes that fall within the substantial spirit and scope of the present disclosure.

The invention claimed is:

1. A sealing plug, wherein the sealing plug comprises:
a plug body, the plug body having a central axis, an insertion portion, and a support portion that is arranged around the central axis and the insertion portion, such that the plug body defines a bowl-shape, wherein the support portion comprises a support body portion and has at least two outer edge portions that each define a bottom surface along a bottom of the support portion;
at least two holding arms, wherein each holding arm of the at least two holding arms extends downward from the bottom of the support portion of the plug body and has a vertical portion that is parallel with the central axis and extends perpendicularly from the bottom surface, and each holding arm has a holding portion, wherein each holding portion extends from the vertical portion obliquely downward relative to the bottom surface in a direction away from the central axis; and
a sealing portion, the sealing portion being arranged on an outer edge of the support portion of the plug body,
wherein the outer edge of the support portion includes at least two first outer edge portions that extend obliquely outward and downward from the support body portion, and
wherein the plug body comprises a metal material, and the sealing portion comprises a material with a melting point lower than a melting point of the metal material.

2. The sealing plug of claim 1, wherein the sealing plug is configured to seal a hole in a panel, wherein the sealing plug is configured such that when the sealing plug is mounted in the hole in the panel, the holding portions of the at least two holding arms are located below the panel, the support portion and the sealing portion are located above the panel, and the sealing portion comes into contact with the panel such that the hole is sealed by the sealing plug.

3. The sealing plug of claim 2, wherein the sealing portion comprises a flexible material.

4. The sealing plug of claim 3, wherein the sealing portion comprises an ethylene-vinyl acetate copolymer.

5. The sealing plug of claim 2, wherein the at least two holding arms respectively have root portions connected to the support portion, and a distance from the root portions to the central axis is less than a radius of the hole of the panel.

6. The sealing plug of claim 2, wherein the outer edge of the support portion is configured such that when the sealing portion melts, a lower surface of the outer edge contacts the panel to seal the hole.

7. The sealing plug of claim 6, wherein the outer edge is arranged around the support body portion; and
the outer edge comprises
at least two second outer edge portions, the at least two second outer edge portions being arranged to separate the at least two first outer edge portions and extending parallel with a plane of the support body portion, wherein the at least two holding arms are positioned adjacent to the at least two second outer edge portions.

8. The sealing plug of claim 7, wherein a lowest position of a free end of each of the at least two first outer edge portions is coplanar with a lower surface of each of the at least two second outer edge portions.

9. The sealing plug of claim 8, wherein the insertion portion extends downward from the support portion, wherein the at least two holding arms are arranged around the insertion portion, and wherein the insertion portion is configured to be insertable into the hole of the panel.

10. The sealing plug of claim 9, wherein the plug body is integrally formed from sheet metal.

11. The sealing plug of claim 7, wherein the at least two holding arms comprise two holding arms, which are symmetrically arranged with respect to the central axis of the plug body.

12. The sealing plug of claim 7, wherein the at least two holding arms comprise four holding arms, which are uniformly arranged in a circumferential direction of the plug body.

* * * * *